(12) United States Patent
DeSimone et al.

(10) Patent No.: US 6,716,945 B2
(45) Date of Patent: Apr. 6, 2004

(54) MULTIMODAL FLUOROPOLYMERS AND METHODS OF MAKING THE SAME

(75) Inventors: Joseph M. DeSimone, Chapel Hill, NC (US); George W. Roberts, Raleigh, NC (US); Paul A. Charpentier, Ontario (CA)

(73) Assignees: North Carolina State University, Raleigh, NC (US); University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 09/860,413

(22) Filed: May 18, 2001

(65) Prior Publication Data

US 2002/0040118 A1 Apr. 4, 2002

Related U.S. Application Data

(60) Provisional application No. 60/205,817, filed on May 19, 2000.

(51) Int. Cl.⁷ .............................................. C08F 214/22
(52) U.S. Cl. ...................... 526/255; 526/250; 526/253; 526/254; 526/242; 526/84; 526/89; 525/388; 524/80
(58) Field of Search .......................... 526/89, 255, 242, 526/250, 253, 254, 84; 524/80; 525/388

(56) References Cited

U.S. PATENT DOCUMENTS

| 4,076,929 A | * | 2/1978 | Dohany ..................... 526/255 |
| 5,272,236 A | | 12/1993 | Lai et al. ................... 526/348.5 |
| 5,514,759 A | * | 5/1996 | DeSimone et al. ......... 526/255 |
| 5,548,043 A | * | 8/1996 | Saban et al. ............... 525/242 |
| 5,548,046 A | * | 8/1996 | Sanchez ...................... 526/217 |
| 5,739,223 A | | 4/1998 | DeSimone ................... 526/89 |
| 5,981,673 A | | 11/1999 | DeSimone et al. ........... 526/89 |
| 6,031,027 A | | 2/2000 | Syre et al. .................. 523/344 |
| 6,034,170 A | * | 3/2000 | Tuminello et al. .......... 524/545 |
| 6,051,682 A | * | 4/2000 | Debrabander et al. ...... 528/501 |
| 6,242,548 B1 | * | 6/2001 | Duchesne et al. .......... 526/242 |

FOREIGN PATENT DOCUMENTS

| EP | 0964009 A1 | 12/1999 | ......... C08F/214/22 |
| WO | WO 98/28351 | 7/1998 | ........... C08F/14/18 |
| WO | WO 00/53639 | 9/2000 | ............. C08F/2/04 |

OTHER PUBLICATIONS

Charpentier et al., "Continuous Precipitation Polymerization of Vinylidene Fluoride in Supercritical Carbon Dixide: Modeling the Rate of Polymerization," *Ind. Eng. Chem. Res.*, 39:12 4588–4586 (2000).

Tervoort et a., "Melt–Processable Poly(tetrafluoroethylene)," *Macromolecules*, 33:6460–6465 (2000).

Charpentier et al., "Continuous Polymerizations in Supercritical Carbon Dioxide: Chain–Growth Precipitation Polymerizations," *Macromolecules*, 32:5973–5975 (1999).

International Search Report for PCT/US01/16252, completed Jan. 16, 2002.

Charpentier, P.A. et al. Communications to the Editor, Continuous Polymerizations in Supercritical Carbon Dioxide: Chain–Growth Precipitation Polymerizations, *Macromolecules* 32, 5973–5795 (1999).

* cited by examiner

*Primary Examiner*—David W. Wu
*Assistant Examiner*—Henry S. Hu
(74) *Attorney, Agent, or Firm*—Myers Bigel Sibley & Sajovec, P.A.

(57) ABSTRACT

A method for forming a fluoropolymer comprises providing a reaction mixture comprising carbon dioxide, at least one fluoromonomer, and an initiator; and reacting the at least one fluoromonomer in the reaction mixture to form a fluoropolymer. The fluoropolymer has a multimodal molecular weight distribution.

25 Claims, 7 Drawing Sheets

MULTIMODAL FLUOROPOLYMERS AND METHODS OF MAKING THE SAME

CROSS-REFERENCE TO RELATED APPLICATIONS

The present application claims priority to U.S. Provisional Application No. Ser. No. 60/205,817 filed May 19, 2000, the disclosure of which is incorporated herein by reference in its entirety.

FIELD OF THE INVENTION

The present invention generally relates to novel polymers and methods of making the same.

BACKGROUND OF THE INVENTION

Molecular weight distribution (MWD), or polydispersity, is a well known variable in polymers. The molecular weight distribution can be measured directly, e.g., by gel permeation chromatography (GPC) techniques, or indirectly, by measuring $I_{10}/I_2$ ratio, as described in ASTM D-1228. The polydispersity or polydispersity index (PDI), defined as the ratio of the weight average moelcular weight ($M_w$) to the number average molecular weight ($M_n$) (i.e., $M_w/M_n$), is a single index of the breadth of the MWD. The larger the PDI, the broader the MWD.

Fluoropolymers, such as for example, homo, co, and terpolymers of vinylidene fluoride, have been observed to exhibit excellent physical properties including resistance to weathering, UV, and chemicals. Accordingly, these materials are well-suited for a number of applications relating to high temperature wire insulation, chemical tank linings, protecting paints and coatings, valves and impeller parts, and sealants. Notwithstanding these advantages, these fluoropolymers often possess low melt elasticity causing problems in melt fabrication. Additionally, such polymers may experience melt fracture surface properties at relatively low extrusion rates thereby processing in a less than desirable manner. Low shear sensitivity (i.e., a low $I_{10}/I_2$ value) often limits the extrudability of such polymers.

There is a need in the art to address the above-mentioned problems with respect to fluoropolymers.

SUMMARY OF THE INVENTION

In one aspect, the invention provides a method for forming a fluoropolymer. The method comprises providing a reaction mixture comprising carbon dioxide, at least one fluoromonomer, and an initiator; and reacting the at least one fluoromonomer in the reaction mixture to form a fluoropolymer. The fluoropolymer has a multimodal molecular weight distribution.

In another aspect, the invention provides a fluoropolymer having a multimodal molecular weight distribution. The fluoropolymer has a weight average molecular weight to number average molecular weight ratio of from about 2 to about 10.

In another aspect, the invention provides a composition of matter. The composition of matter comprises a mixture comprising carbon dioxide and a fluoropolymer having a multimodal molecular weight distribution. The fluoropolymer has a weight average molecular weight to number average molecular weight ratio of from about 2 to about 10.

Other aspects of the present invention are presented in detail in the specification set forth below.

DETAILED DESCRIPTION OF THE INVENTION

Figure 1:
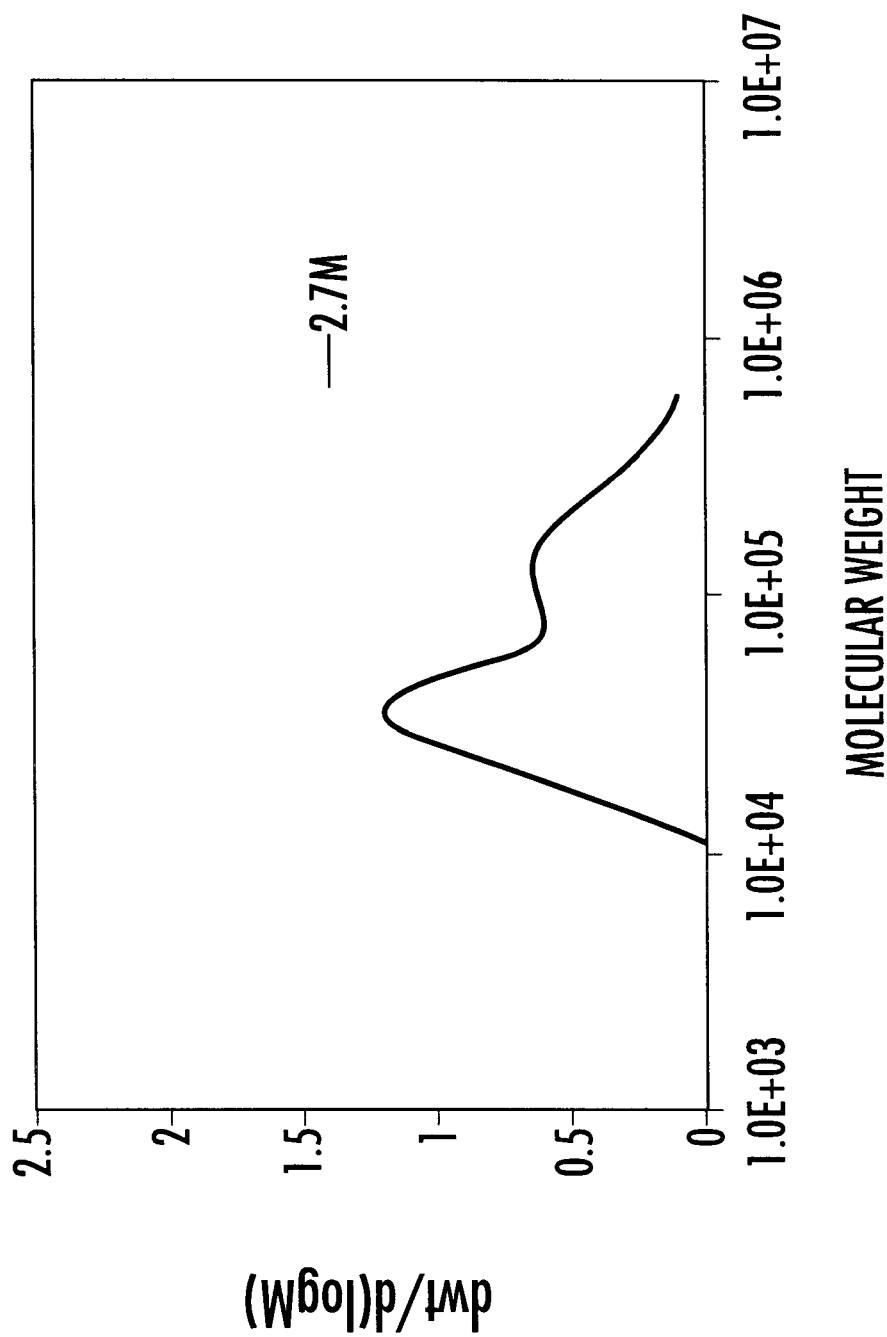
FIGS. 1–2 are graphs illustrating the effect of initial fluoromonomer concentration on molecular weight distribution for (poly)vinylidene fluoride.

The invention will now be described in detail with respect to the foregoing preferred embodiments described in the specification, drawings, and examples. It should be noted, however, that these embodiments are for the purposes of illustrating the invention and do not limit the invention as defined by the claims in the following section.

In one aspect, the invention provides a method for forming a fluoropolymer. The method comprises providing a reaction mixture comprising carbon dioxide, at least one fluoromonomer, and an initiator; and reacting the at least one fluoromonomer in the reaction mixture to form a fluoropolymer. The resulting fluoropolymer has a multimodal molecular weight distribution. In preferred embodiments, the fluoropolymer has a bimodal molecular weight distribution. The invention encompasses polymers that may be soluble or insoluble in $CO_2$ as well as those which are insoluble and swellable in $CO_2$. For example, (poly)vinylidene fluoride is not soluble in carbon dioxide.

For the purposes of the invention, carbon dioxide is employed as a fluid in a reaction mixture in a gaseous, liquid, or supercritical phase. The reaction mixture typically employs carbon dioxide as a continuous phase, with the reaction mixture typically comprising from about 1 to about 99 percent by weight of carbon dioxide, and more preferably from about 40 to about 90 percent by weight of carbon dioxide. In one embodiment, "high pressure" $CO_2$ can be used. "High pressure" preferably refers to the $CO_2$ having a pressure from about 500 or about 850 psia to about 10,000 psia. If liquid $CO_2$ is used, the temperature employed during the process is below about 31° C. In one preferred embodiment, the $CO_2$ is utilized in a "supercritical" phase. As used herein, "supercritical" means that a fluid medium is at a temperature that is sufficiently high that it cannot be liquefied by pressure. The thermodynamic properties of $CO_2$ are reported in Hyatt, *J. Org. Chem.* 49: 5097–5101 (1984); therein, it is stated that the critical temperature of $CO_2$ is about 31° C.

In particular, the methods of the present invention are preferably carried out at a temperature range from about −50° C. to about 500° C., and more preferably from about 20° C. to about 100° C. In general, as an example, the pressures employed preferably range from about 200 psia to about 50,000 psia, and more preferably from about 850 psia to about 10,000 psia. It should be appreciated however that other conditions may be employed as determined by one skilled in the art.

The fluoromonomers useful in the processes of the present invention include various suitable fluoromonomers known to those skilled in the art. Preferably, the fluoromonomers are soluble in carbon dioxide. The fluoromonomers may be in a gaseous or liquid state. Generally, the fluoromonomers useful in the processes of the present invention are homopolymerizable or copolymerizable by a free radical mechanism. Preferred fluoromonomers will contain at least one fluorine atom, perfluoroalkyl group, or perfluoroalkoxy group directly attached to the vinyl group that undergoes polymerization. Examples of suitable fluoromonomers include, but are not limited to, fluoroolefins (e.g., perfluoroolefins), particularly tetrafluoroethylene, perfluoro (alkyl vinyl ethers) with perfluoroalkyl groups containing 1 to 6 carbon atoms and those containing functional groups such as $CF_2=CFOCF_2CF(CF_3)OCF_2CF_2SO_2F$ and $CF_2=CFOCF_2CF(CF_3)OCF_2CF_2CO_2CH_3$, hexafluoropropylene, perfluoro(2,2-dimethyldioxole), and partially fluorinated monomers, particularly vinyl fluoride, vinylidene fluoride, chlorotrifluoroethylene, and perfluoroalkyl ethylenes with perfluoroalkyl groups containing 1 to 6 carbon atoms. Copolymers of fluoromonomers with nonfluorinated monomers, particularly ethylene, propylene, vinylacetate, alkylvinyl ethers, acrylates, methacrylates, and styrenics are also encompassed. Vinyl chloride can also be employed. Copolymers of fluoromonomers with monomers having a functional group suitable for crosslinking, such as bromotrifluoroethylene and bromodifluoroethylene may also be included. Preferred fluoromonomers include tetrafluoroethylene, hexafluoropropylene, perfluoromethylvinyl ether, perfluoroethylvinyl ether, perfluoropropylvinyl ether, vinyl fluoride, vinylidene fluoride, chlorotrifluoroethylene, and perfluoro(2,2-dimethyl dioxole).

The fluoropolymers produced according to the processes of the present invention include homopolymers of any of the foregoing fluoromonomers, or in the embodiment wherein one or more comonomers are employed in combination with the fluoromonomer, the resulting fluoropolymers may be copolymers. Fluoropolymers that are soluble or insoluble in carbon dioxide may be produced by virtue of the invention.

As stated above, homopolymers of the above monomers are contemplated within the scope of the present invention. Exemplary homopolymers which may be produced according to the methods of the present invention include, but are not limited to, polytetrafluoroethylene, polyvinylfluoride, polyvinylidine fluoride, polychlorotrifluoroethylene, and the like.

The comonomers useful in the methods of the present invention may be fluoromonomers (as indicated above), or they may be non-fluorinated monomers which are capable of copolymerizing with the fluoromonomers of the present invention. Suitable non-fluorinated comonomers include those described above.

Copolymers which may be produced according to the processes of the present invention include but are not limited to: tetrafluoroethylene/hexafluoropropylene, tetrafluoroethylene/hexafluoropropylene/vinylidine fluoride, hexafluoropropylene/vinylidine fluoride, perfluoro(methyl vinyl ether)/vinylidine fluoride, perfluoro(methyl vinyl ether)/vinylidenefluoride/tetrafluoroethylene, chlorotrifluoroethylene/vinylidine fluoride, chlorotrifluoroethylene/ethylene, chlorotrifluoroethylene/tetrafluoroethylene/ethylene, tetrafluoroethylene/perfluoro(propyl vinyl ether), tetrafluoroethylene/perfluoro(methyl vinyl ether), tetrafluoroethylene/perfluoro(2,2-dimethyl-1,3-dioxole), tetrafluoroethylene/ethylene, tetrafluoroethylene/propylene, tetrafluoroethylene/$CF_2=CFOCF_2CF(CF_3)OCF_2CF_2SO_2F$, tetrafluoroethylene/$CF_2=CFOCF_2CF_2SO_2F$, and tetrafluoroethylene/hexafluoropropylene/perfluoro(propyl vinyl ether).

Preferred copolymers which may be produced according to processes of the present invention include perfluorinated copolymers such as tetrafluoroethylene/perfluoro(propyl vinyl ether), tetrafluoroethylene/hexafluoropropylene, tetrafluoroethylene/perfluoro(2,2-dimethyl-1,3-dioxide), tetrafluoroethylene/perfluoro(methyl vinyl ether), and tetrafluoroethylene/$CF_2=CFOCF_2CF_2SO_2F$.

Various fluoromonomer concentrations can be used in the methods of the invention. In a preferred embodiment, for example, the initial concentration of fluoromonomer ranges from about 0.1, 0.5, 1, or 3 M to about 5, 6, 8, or 10 M.

In the methods of the present invention, the fluoromonomers are polymerized in the presence of a polymerization initiator. A number of initiators can be employed. In preferred embodiments, the initiator is a peroxydicarbonate or a halogen-based acyl peroxide initiator (preferably a fluorocarbon-based acyl peroxide). A preferred peroxycarbonate is ethyl peroxydicarbonate. A preferred fluorocarbon-based acyl peroxide is perfluoropropionyl peroxide. Various amounts of initiator can be used in the methods of the invention. As an example, a preferred amount of initiator ranges from about 1 mg to about 1000 mg of initiator per 100 grams of reaction mixture.

The initiator may be added in neat form, as a solution in carbon dioxide, or it may conveniently be added as a solution in a cosolvent, such as, for example, one described below.

The polymerization reaction mixture may also include one or more cosolvents. Illustrative cosolvents include but are not limited to, perfluorocarbons, hydrofluorocarbons, perfluoroalkyl sulfides, and like. It may be desirable for the cosolvent to be capable of solubilizing the initiator such that the initiator may be provided to the reaction in the solubilized form.

The polymerization reaction mixture may include other additives and reactants known to those skilled in the art for controlling the physical or chemical properties of the resulting polymer. For example, in one preferred embodiment, the polymerization reaction mixture includes a chain transfer agent for regulating the molecular weight of the resulting polymer. Suitable chain transfer agents will be readily known to those skilled in the art and include, for example, hydrocarbons such as ethane and methyl cyclohexane; alcohols, such as methanol; mercaptans, such as ethyl and butyl mercaptan; sulfides, such as butyl sulfide; and halogenated hydrocarbons such as alkyl iodides, perfluoroalkyl iodides, alkyl bromides, perfluoroalkyl bromides, carbon tetrachloride, and chloroform.

It may also be desirable to also include compounds which accelerate the decomposition of the initiator. Suitable compounds which accelerate decomposition are known to those skilled in the art and include but are not limited to, redox systems, sulfur dioxide, ultraviolet light, and others. One example of a redox system that can be employed uses benzoyl peroxide and N,N-dimethyl aniline. Other redox systems however can be employed as recognized by one skilled in the art.

The method of the present invention (i.e., the polymerization) can be carried out batchwise, semicontinuously, or continuously with thorough mixing of the reactants in any appropriately designed reaction vessel. For the purposes of the invention, the term "reaction vessel" is to be broadly construed and may be interpreted to include, without limitation, various pressure apparatuses, reactors, autoclaves, reactors, systems, and the like, particularly those capable of accommodating high pressures. Preferably, two phases exist during the polymerization: (1) a fluid phase comprising the carbon dioxide, fluoromonomer, and initiator and (2) a phase of solid polymer particles. In one embodiment, the polymers may be produced via a continuous controlled polymerization process using at least one reaction vessel, but can also be produced using multiple reactors at polymerization temperatures and pressures sufficient to produce the polymers having the desired properties. See e.g., U.S. Pat. Nos. 5,272,236 and 3,914,342, the disclosures of which are incorporated herein by reference in their entirety. Preferably, the polymerization temperature ranges from about 0° C., 20° C., 50° C., or 70° C. to about 100° C. or 200° C. The polymerization can be employed as a solution polymerization process. Suspension, gas phase, or other process conditions can be employed if desired. Precipitation polymerization is preferred.

In one particular embodiment, the reaction vessel used to carry out the present invention is preferably a stirred tank reactor or continuous flow stirred tank reactor (CSTR), and is most preferably an "ideal" stirred tank reactor. It should be appreciated, however, that this is only one type of reaction vessel, and others may be used for the purposes of the invention as alluded to hereinabove. By "ideal stirred tank reactor" is meant one which sufficiently approximates for commercial conditions a state in which the reactor contents are perfectly mixed so that the system properties are uniform throughout (e.g., for reactor design and analysis purposes). See, e.g., C. Hill, *An Introduction to Chemical Engineering Kinetics and Reactor Design*, page 270 (1977). Another definition of an ideal CSTR is a reactor whose dimensionless exit age distribution function $E(\theta)$, reaches a maximum value in the dimensionless time interval between $\theta=0$ and $\theta=0.20$ and then declines monotonically after reaching the maximum value. In a preferred embodiment of an ideal CSTR, the cumulative exit age distribution function, F, has a value between 0.54 and 0.70 when $\theta=1$. In a preferred embodiment, the dimensionless exit age distribution for an ideal CSTR reaches its maximum at $\theta=0$ and has a value of $F=0.63$ when $\theta=1$. For the purposes of the invention, $\theta$ is defined as the actual time divided by the reactor space time, i.e., the time elapsed in processing one reactor volume of feed at specified conditions. It should be appreciated that other embodiments are certainly encompassed within the scope of the invention. See e.g., O. Levenspiel, *Chemical Reaction Engineering*, $3^{rd}$ Ed., pp. 257–269, John Wiley & Sons, New York, N.Y., (1999).

In a particular embodiment of the invention, an apparatus for the continuous polymerization of a monomer in carbon dioxide comprises a continuous reaction vessel; an effluent line connected to the reaction vessel; a control valve connected to the effluent line; a first separator and a second separator connected to the control valve, the control valve switchable between (i) a first position in which the first separator is in fluid communication with the effluent line while the second separator is not, and (ii) a second position in which the second separator is in fluid communication with the effluent line while the first separator is not; and a return line connecting each of the first and second separators to the reaction vessel so that the carbon dioxide is returned to the reaction vessel from the separators while solid polymer is retained in the separator; and control means operatively associated with the return line for maintaining the reaction medium as a liquid or supercritical fluid in the first and second separators; whereby effluent from the continuous reaction vessel can be (i) continuously passed through the first separator while polymer may be removed from the second separator by switching the inlet control valve to the first position, and (ii) continuously passed through the second separator while polymer may be removed from the first separator by switching the inlet control valve to the second position. The separators may be filter separators or cyclone separators, as well as other types of separators. The apparatus is described in U.S. Ser. No. 09/709,206 filed Nov. 9, 2000, the disclosure of which is incorporated herein by reference in its entirety.

To remove the heat evolved during the polymerization, the reaction vessel may optionally include a cooling system. Other optional features of the reaction vessel used in accordance with the invention may include heating means such as an electric heating furnace to heat the reaction mixture to the desired temperature and mixing means, i.e., stirrers such as paddle stirrers, impeller stirrers, or multistage impulse countercurrent agitators, blades, and the like.

The polymerization can be carried out, for example, by feeding a mixture of monomer and carbon dioxide into a reaction vessel containing the initiator. The reaction vessel is closed and the reaction mixture brought to the polymerization temperature and pressure. The reaction mixture is preferably agitated using techniques known to one skilled in the art. Alternatively, only a part of the reaction mixture may be introduced into the reaction vessel and heated to the polymerization temperature and pressure, with additional reaction mixture being pumped in at a rate corresponding to the rate of polymerization. In another possible procedure, some of the monomers are initially taken into the reaction vessel in the total amount of carbon dioxide and the monomers or comonomers are pumped into the reaction vessel together with the initiator at the rate at which the polymerization proceeds. A preferred residence time for the reaction is from about 5, 10, or 20 min. to about 50, 100, or 200 min., although it should be appreciated that other times can be employed for the purposes of the invention.

In one embodiment, a separate fluid phase comprising carbon dioxide and solid polymer phase is present as a result of the reacting step of the invention. When the polymerization is complete the polymer may be separated from the reaction mixture. Any suitable means of separating the polymer from the reaction mixture may be employed. In one embodiment, the polymer is separated from the reaction mixture by venting the polymerization medium to the atmosphere. Thereafter the polymer may be collected by physical isolation. In another embodiment, the polymer can be collected from the reaction vessel without venting the reaction mixture to a lower pressure region. In this instance, the carbon dioxide, along with any other component contained therein, may be recycled to the reaction vessel for use in further processes without appreciable pressure loss. An example of such an embodiment is set forth in U.S. Ser. No. 09/709,206 filed Nov. 9, 2000.

It may be desirable in some applications to wash the resulting polymer prior to further processing. If washing is employed, the polymer is preferably washed in a wash fluid comprising carbon dioxide prior to or after venting the polymerization medium to the atmosphere and collecting the polymer. Typically, the wash fluid comprises carbon dioxide, or a mixture of carbon dioxide with methanol, amines such as ammonia, or fluorine gas. The methanol, amines, or fluorine gas may be introduced into the reaction vessel containing the polymerization medium by suitable means known to those skilled in the art.

In another aspect, the invention provides a fluoropolymer having a multimodal molecular weight distribution. The fluoropolymer preferably has a weight average molecular weight to number average molecular weight ratio of from about 2, 3, or 4 to about 6, 7, 8, 9, or 10. The weight average molecular weight ($M_w$) may be defined as follows:

$$M_w = \Sigma N_x M_x^2 / \Sigma N_x M_x$$

wherein $N_x$ is the mole fraction of polymer with molecular weight $M_x$. See e.g., Odian, G., *Principles of Polymerization*, $2^{nd}$ Ed., Wiley-Interscience (pp. 22–23) (1981).

The number average molecular weight ($M_n$) may be defined as follows:

$$M_n = \Sigma N_x M_x / \Sigma N_x$$

wherein $N_x$ and $M_x$ are defined above.

In general, $M_n$ may be defined as the first moment around the origin of the mole fraction of the polymer. $M_w$ may be defined as the second moment around the origin of the mole fraction of the polymer divided by the first moment around the origin. See *Polymer Chemistry: An Introduction*, R. B. Seymour et al., $3^{rd}$ Ed., Marcel Dekker, Inc., pp. 100–101, (1992). The fluoropolymer may encompass polymers (e.g., homo-, co-, and terpolymers) described herein, as well as others, and can be formed from monomers set forth herein.

In another aspect, the invention relates to a fluoropolymer formed by any of the methods recited herein.

The invention may also encompass articles of manufacture comprising the fluoropolymer. Exemplary articles of manufacture include, but are not limited to, high temperature wire insulation, chemical tank linings, protecting paints and coatings, valves and impeller parts, sealants, and shrinkage tubing to encapsulate resistors, diodes, and soldered joints.

In another aspect, the invention provides a composition of matter. The composition of matter comprises a mixture comprising carbon dioxide and a fluoropolymer having a multimodal molecular weight distribution. The fluoropolymer preferably has a weight average molecular weight to number average molecular weight ratio of from about about 2, 3, or 4 to about 6, 7, 8, 9, or 10.

The invention is highly advantageous in that the fluoropolymer described herein is capable of displaying improved melt flow properties. For example, in a preferred embodiment, the fluorinated polymer may have a melt flow index (MFI) ranging from about 0.01 g/min. to about 1000 g/min. measured at 230° C. One example of a suitable technique for determining MFIs is set forth in Charpentier, et al. *Ind. Eng. Chem. Res*, 2000, 39, p. 4589 which teaches determining MFIs with a Kayeness melt flow indexer at 230° C. according to the method of ASTM D-1238. The methods of forming multimodal polymers in accordance with the invention are distinct from methods for forming multimodal polymers by compounding. In conventional compounding methods, two distinct polymers are combined to form a multimodal polymer composition. Although not intending to be bound by any one theory, it is believed that the method of the invention forms a multimodal polymer directly by reacting at least one fluoromonomer in the presence of an initiator in which micromixing takes place in the fluid phase within the reaction vessel. For the purposes of the invention, the term "micromixing" refers to one or more of the components (e.g., fluoromonomer and/or initiator) being mixed at the molecular level in the fluid phase.

The invention will now be described further with respect to the foregoing examples. It should be appreciated that these examples are for the purpose of illustrating the invention, and do limit the scope of the invention as defined by the claims.

EXAMPLE 1

Continuous Polymerization of Vinylidene Fluoride

The polymerization of vinylidene fluoride was carried out as follows. The reaction vessel was first heated to the desired temperature and the agitator was set to 1800 revolutions per minute (RPM). The reaction vessel was then purged with $N_2$. After about 2 hours, the control valve was closed and the system was pressurized with $CO_2$ to the desired reactor pressure. The desired $CO_2$ flow rate was set and the temperature and pressure of the system were allowed to stabilize. Temperature control was ±0.2° C., while pressure control was ±1 bar. When the system had stabilized, the initiator flowrate was set and initiator was allowed to flow through the system for at least 3 residence times in order to remove impurities. Monomer flow was then started. The initial monomer concentration was 2.7 M. At least 5 residence times after the introduction of monomer, with the CSTR at steady-state, the 3-way ball valve was switched and the stream exiting the CSTR was fed to the empty filter/collector, where steady-state polymer was collected for between 30 and 60 minutes. After this time, the ball valve was switched so that effluent flowed to the original collector, and the monomer and initiator feed streams were stopped so that only pure $CO_2$ was fed through the system for cleaning. The system was finally vented and the polymer collected and weighed.

The resulting molecular weight distribution is set forth in FIG. 1.

In this embodiment, the method of determining the molecular weight distribution for the resulting polymer is set forth in Charpentier, et al. supra at 4589. Charpentier et al. teaches using a Gel Permeation Chromatograph (GPC) to perform such measurements. An example of a suitable system is a Waters-Alliance HPLC System with 2×HR5E and 1×HR2E columns, using N,N-dimethylformamide (DMF) modified with 0.1 M LiBr. The GPC is calibrated at 40° C. using narrow molecular weight distribution standards of poly(methyl methacrylate) (PMMA) purchased from Polymer Laboratories, Ltd. located in Shropshire, United Kingdom.

In the event that the polymer is not sufficiently soluble for GPC analysis, a technique for determining molecular weight distribution is set forth in Trevoort, et al. *Macromolecules* 2000, 33, pp. 6460–6465.

EXAMPLE 2

Continuous Polymerization of Vinylidene Fluoride

The procedure according to Example 1 was repeated except that the initial concentration of vinylidene fluoride monomer was 2.9 M.

Figure 2:
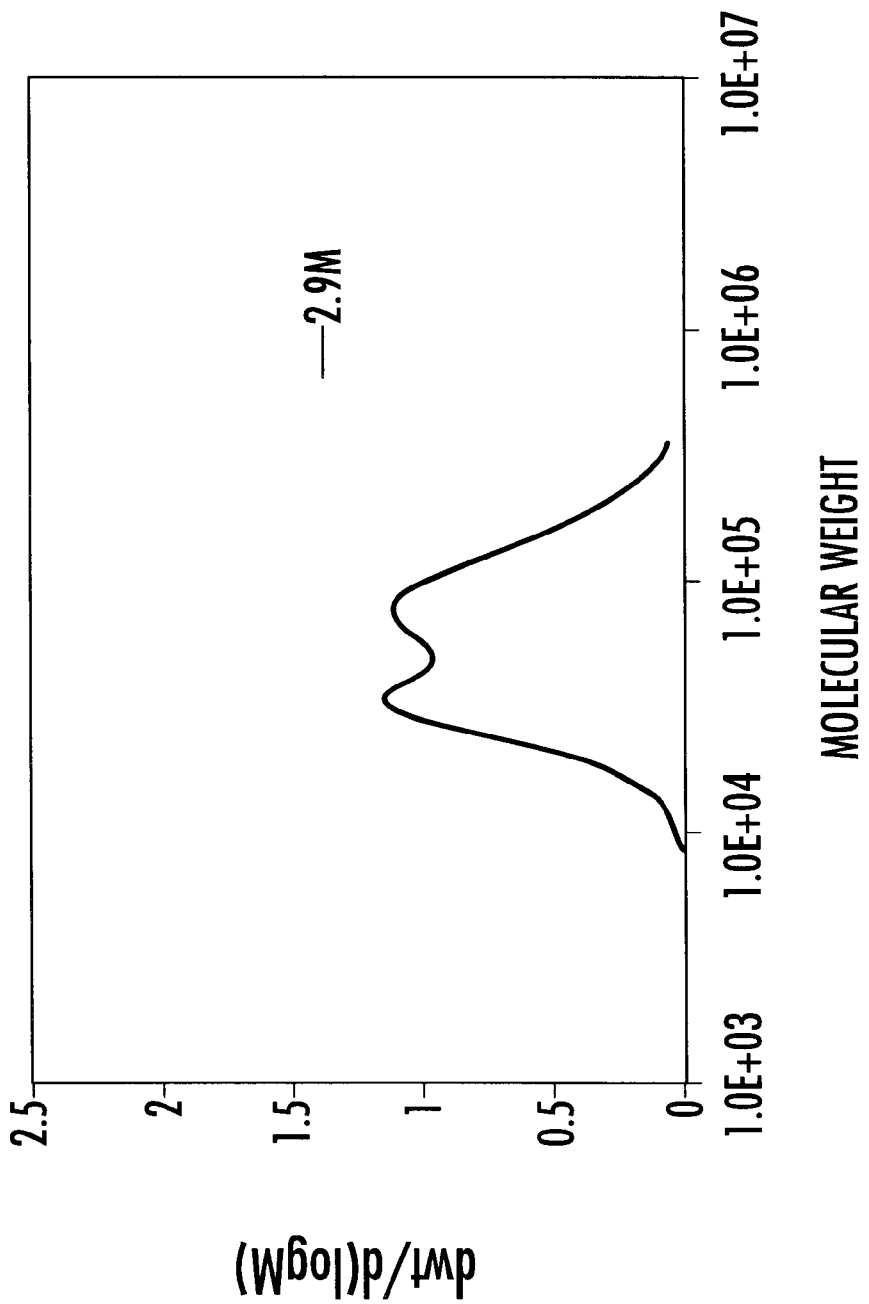

The resulting molecular weight distribution is set forth in FIG. 2.

Figure 3:
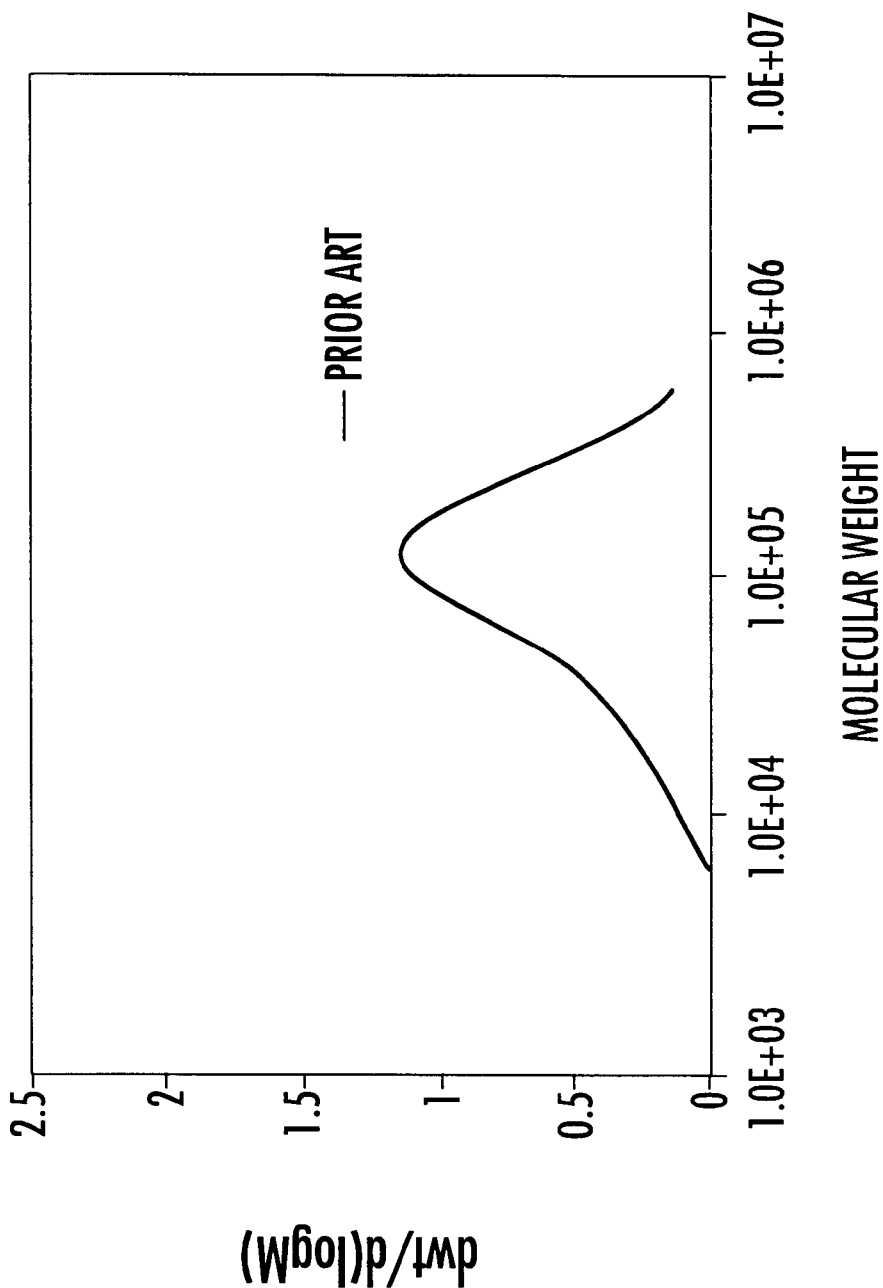
FIG. 3 is a graph illustrating the molecular weight distribution for commercially available (poly)vinylidene fluoride. For the purposes of the invention, d(wt)/d(log M) is defined as the derivative of the cumulative weight of the polymer with respect to the log of the molecular weight. An acceptable technique of determining this ratio is by employing a Gel Permeation Chromatograph (GPC).

Both of polymers formed in Examples 1 and 2 displayed bimodal molecular weight distribution behavior, as opposed to unimodal behavior exhibited by commercially available (poly)vinylidene fluoride shown in FIG. 3.

EXAMPLE 3

Figure 4:
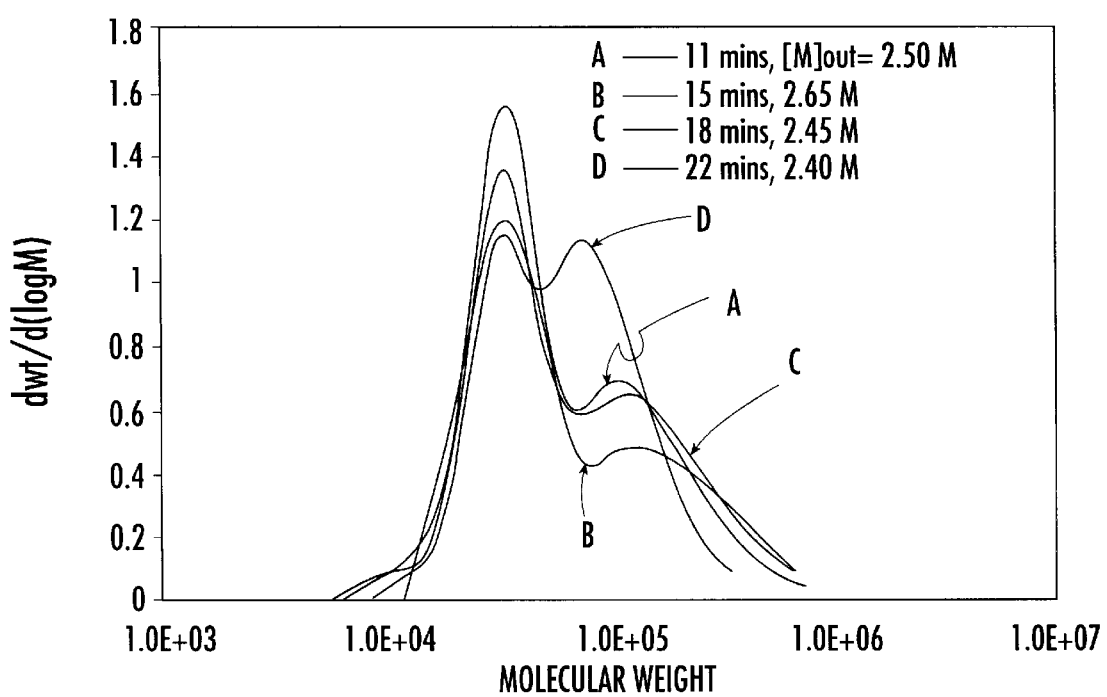
FIG. 4 is a graph illustrating the effect of residence time on molecular weight distribution for a polymer formed in accordance with the invention.

Continuous Polymerization of Vinylidene Fluoride
Effect of Residence Time on Multimodal Behavior The procedure according to Example 1 was repeated for various residence times as set forth in Table 1. Other processing conditions are listed in Table 1. As seen from FIG. 4, the longer residence times typically favored bimodal behavior of the resulting polymer.

TABLE 1

| Run | T(° C.) | P(psig) | Volume ml | [1]in mmol/L | [1]out mmol/ | VF2 in mol/L | VF2 out mol/L | τ mins | Rp g/min | Rp g/min. L | X % | Mn | Mw |
|---|---|---|---|---|---|---|---|---|---|---|---|---|---|
| A | 75 | 4000 | 500 | 2.67 | 1.59 | 2.75 | 2.55 | 11.2 | 0.74 | 1.48 | 9.26 | 42600 | 103400 |
| B | 75 | 4000 | 500 | 2.63 | 1.38 | 2.85 | 2.65 | 15 | 0.55 | 1.11 | 8.94 | 41500 | 100100 |
| B' | 75 | 4000 | 800 | 2.79 | 1.46 | 2.77 | 2.56 | 15 | 0.93 | 1.16 | 9.62 | | |
| C | 75 | 4000 | 500 | 2.46 | 1.18 | 2.76 | 2.46 | 18.2 | 0.67 | 1.33 | 13.3 | 48700 | 151000 |
| D | 75 | 4000 | 800 | 2.90 | 1.25 | 2.81 | 2.44 | 22 | 1.11 | 1.38 | 16.3 | 53000 | 113100 |
| D' | 75 | 4000 | 800 | 2.81 | 1.12 | 2.88 | 2.54 | 25 | 0.90 | 1.13 | 14.8 | | |

EXAMPLE 4

Figure 5:
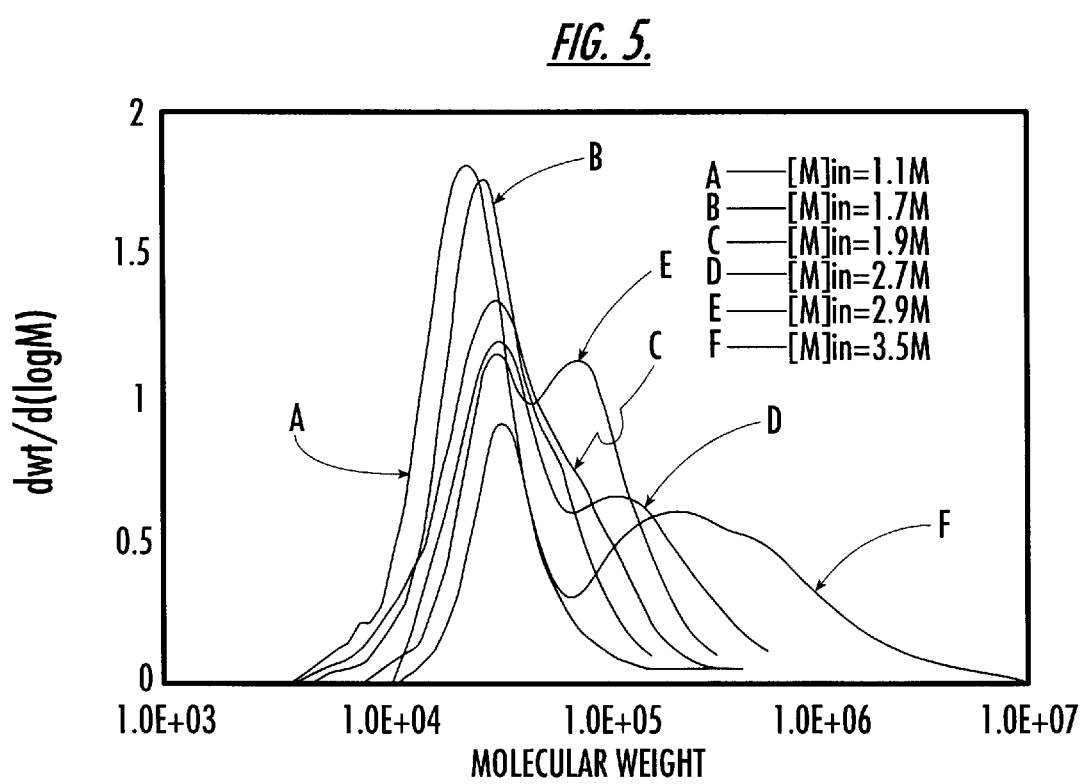
FIG. 5 is a graph illustrating the effect of monomer concentration on molecular weight distribution for a polymer formed in accordance with the invention.

Continuous Polymerization of Vinylidene Fluoride
Effect of Initial Monomer Concentration on Multimodal Behavior The procedure according to Example 1 was repeated for various residence times as set forth in Table 2. Other processing conditions are listed in Table 2. As seen from FIG. 5, higher initial monomer concentration typically favored bimodal behavior of the resulting polymer.

TABLE 2

| Run | T(° C.) | P(psig) | Volume ml | [1]in mmol/L | [1]out mmol/ | VF2 in mol/L | VF2 out mol/L | τ mins | Rp g/min | Rp g/min. L | X % | Mn | Mw |
|---|---|---|---|---|---|---|---|---|---|---|---|---|---|
| A | 75 | 4000 | 800 | 2.83 | 1.26 | 1.13 | 0.96 | 20.9 | 0.45 | 0.56 | 16.1 | 21500 | 51500 |
| B | 75 | 4000 | 800 | 2.95 | 1.27 | 1.68 | 1.44 | 22 | 0.65 | 0.81 | 16.1 | 29600 | 55500 |
| C | 75 | 4000 | 800 | 2.67 | 1.22 | 1.87 | 1.61 | 19.7 | 0.81 | 1.01 | 16.2 | 30400 | 84200 |
| D | 75 | 4000 | 500 | 2.46 | 1.18 | 2.76 | 2.46 | 18.2 | 0.67 | 1.33 | 13.3 | 48704 | 151030 |
| E | 75 | 4000 | 800 | 2.90 | 1.25 | 2.81 | 2.44 | 22 | 1.11 | 1.38 | 16.3 | 53000 | 113100 |
| F | 75 | 4000 | 800 | 3.32 | 1.47 | 3.53 | 3.27 | 21.1 | 1.06 | 1.33 | 12.1 | 78500 | 442600 |

EXAMPLE 5

Figure 6:
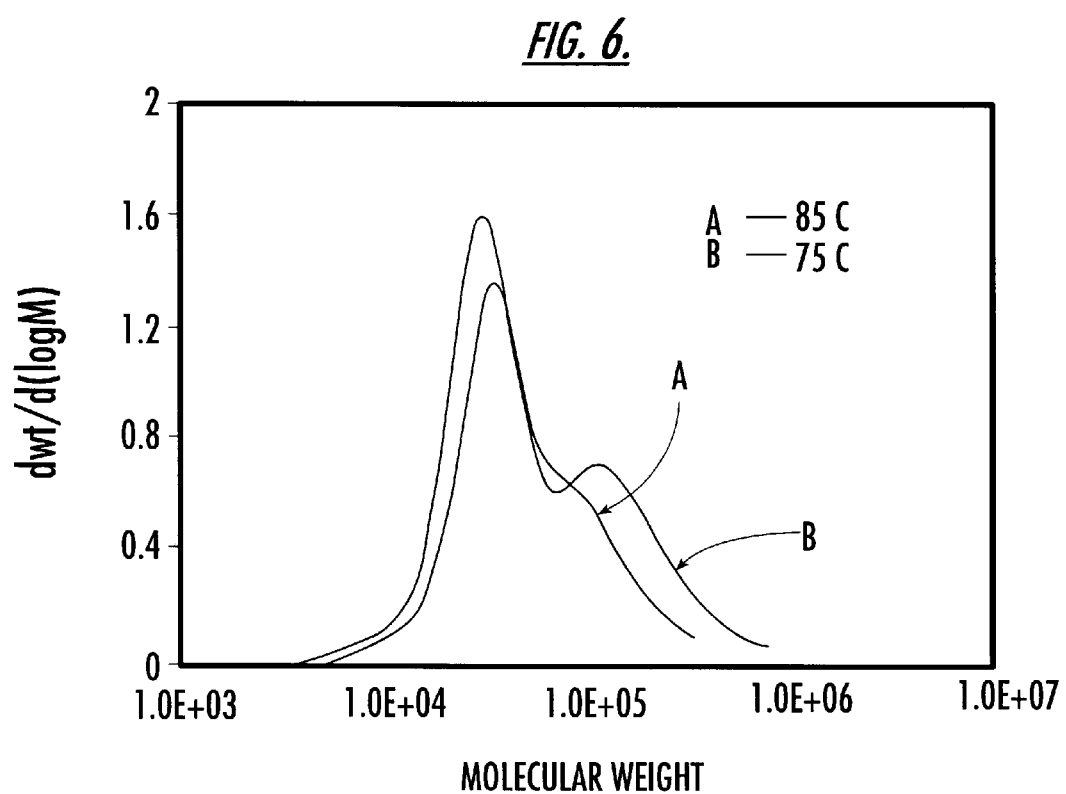
FIG. 6 is a graph illustrating the effect of temperature on molecular weight distribution for a polymer formed in accordance with the invention.

Continuous Polymerization of Vinylidene Fluoride
Effect of Temperature on Multimodal Behavior The procedure according to Example 1 was repeated for various residence times as set forth in Table 3. Other processing conditions are listed in Table 3. As seen from FIG. 6, lower polymerization temperatures typically favored bimodal behavior of the resulting polymer.

TABLE 3

| Run | T(° C.) | P(psig) | Volume ml | [1]in mmol/L | [1]out mmol/ | VF2 in mol/L | VF2 out mol/L | τ mins | Rp g/min | Rp g/min. L | X % | Mn | Mw |
|---|---|---|---|---|---|---|---|---|---|---|---|---|---|
| A | ~85 | 4000 | 500 | 2.56 | 0.82 | 2.62 | 2.36 | 10.8 | 1 | 2.00 | 12.5 | 32200 | 57500 |
| B | 75 | 4000 | 500 | 2.67 | 1.59 | 2.75 | 2.55 | 11.2 | 0.74 | 1.48 | 9.26 | 42600 | 103400 |

EXAMPLE 6

Figure 7:
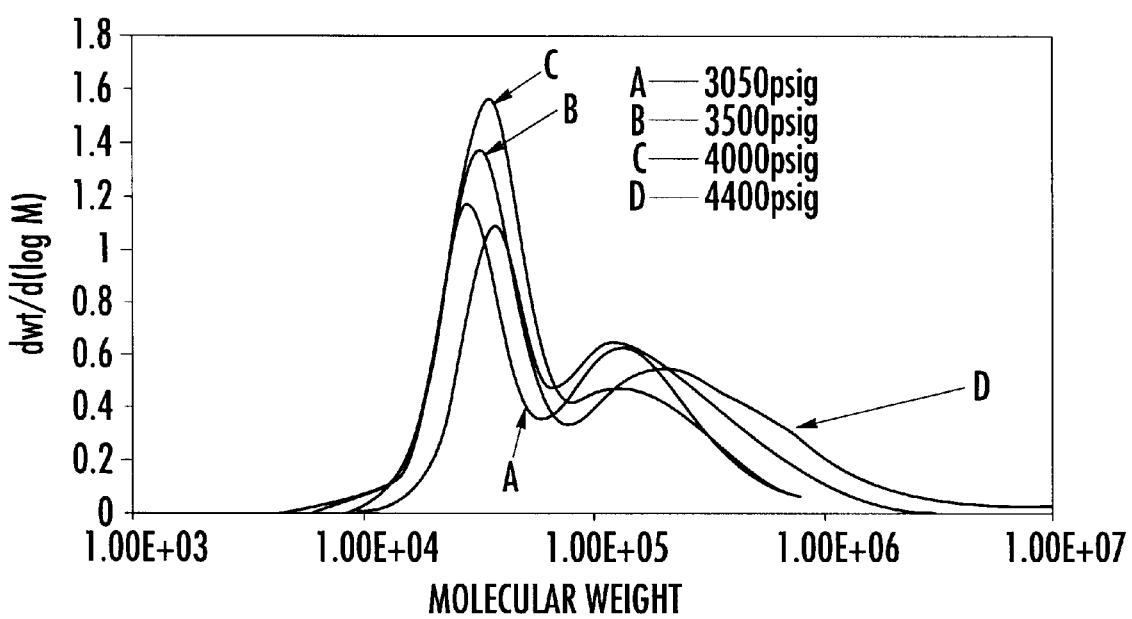
FIG. 7 is a graph illustrating the effect of pressure on molecular weight distribution for a polymer formed in accordance with the invention.

Continuous Polymerization of Vinylidene Fluoride
Effect of Pressure on Multimodal Behavior The procedure according to Example 1 was repeated for various residence times as set forth in Table 4. Other processing conditions are listed in Table 4. As seen from FIG. 7, higher polymerization pressures typically favored bimodal behavior of the resulting polymer.

TABLE 4

| Run | T(° C.) | P(psig) | Volume ml | [1]in mmol/L | [1]out mmol/ | VF2 in mol/L | VF2 out mol/L | τ mins | Rp g/min | Rp g/min. L | X % | Mn | Mw |
|---|---|---|---|---|---|---|---|---|---|---|---|---|---|
| A | 75 | 3050 | 800 | 2.67 | 1.38 | 2.83 | 2.62 | 15.7 | 0.94 | 1.17 | 9.9 | 44600 | 169600 |
| B | 75 | 3500 | 500 | 2.56 | 1.35 | 2.81 | 2.59 | 14.9 | 0.62 | 1.24 | 10.0 | 44900 | 113000 |
| C | 75 | 4000 | 500 | 2.63 | 1.38 | 2.85 | 2.65 | 15.0 | 0.55 | 1.11 | 8.9 | 41500 | 100100 |
| D | 75 | 4400 | 800 | 2.71 | 1.38 | 2.81 | 2.55 | 16.1 | 1.07 | 1.34 | 11.7 | 68600 | 702700 |

The present invention has been described in reference to the preferred embodiments described herein. It should be appreciated, however, that these embodiments are for illustrative purposes only, and do not serve to limit the scope of the invention which is defined by the claims that follow.

That which is claimed is:

1. A method for forming a fluoropolymer, said method comprising:
   providing a reaction mixture comprising carbon dioxide, at least one fluoromonomer, and an initiator; and
   reacting said at least one fluoromonomer in said reaction mixture to form a fluoropolymer;
   wherein said fluoromonomer is provided at a molarity sufficient that said fluoropolymer has a multimodal molecular weight distribution.

2. The method according to claim 1, wherein the fluoromonomer is a fluoroolefin.

3. The method according to claim 1, wherein the fluoromonomer Is vinylidene fluoride.

4. The method according to claim 1, wherein the multimodal molecular weight distribution is bimodal.

5. The method according to claim 1, wherein the carbon dioxide is liquid carbon dioxide.

6. The method according to claim 1, wherein the carbon dioxide is supercritical carbon dioxide.

7. The method according to claim 1, wherein the initiator is a peroxydicarbonate or a halogen-based acyl peroxide.

8. The method according to claim 7, wherein the initiator is a peroxydicarbonate.

9. The method according to claim 8, wherein the peroxydicarbonate is ethyl peroxydicarbonate.

10. The method according to claim 7, wherein the halogen-based acyl peroxide is a fluorocarbon-based acyl peroxide.

11. The method according to claim 10, wherein the fluorocarbon-based acyl peroxide is difluoropropionyl peroxide.

12. The method according to claim 1, wherein the fluoromonomer has an initial concentration ranging from about 0.5 M to about 6 M.

13. The method according to claim 1, wherein the fluoropolymer is a fluoroolefin polymer.

14. The method according to claim 1, wherein the fluoropolymer is (poly)vinylidene fluoride.

15. The method according to claim 1, wherein the fluoromonomer is selected from the group consisting of vinylidene fluoride, tetrafluoroethylene, hexafluoropropylene, and mixtures thereof.

16. The method according to claim 1, wherein said fluoropolymer is a copolymer or terpolymer.

17. The method according to claim 16, wherein said fluoropolymer is formed from monomers selected from the group consisting of vinylidene fluoride, tetrafluoroethylene, hexafluoropropylene, and mixtures thereof.

18. The method according to claim 1, wherein said method is carried out continuously.

19. The method according to claim 18, wherein said method is carried out in an ideal CSTR.

20. A method according to claim 1, wherein a fluid phase and a distinct solid polymer phase are present as a result of said reaction step.

21. A method for forming a fluoropolymer, said method comprising:
   providing a reaction mixture comprising carbon dioxide, at least one fluoromonomer having an initial concentration ranging from about 0.5 M to about 6 M and a peroxydicarbonate or a fluorocarbon-based acyl peroxide initiator; and
   reacting said at least one fluoromonomer in said reaction mixture to form a fluoropolymer;
   wherein said fluoropolymer has a bimodal molecular weight distribution.

22. The method according to claim 21, wherein said method is carried out continuously.

23. The method according to claim 22, wherein said method is carried out in an ideal CSTR.

24. A method according to claim 21, wherein a fluid phase and a distinct solid polymer phase are present as a result of said reaction step.

25. A method for forming a fluoropolymer, said method comprising:
   providing a reaction mixture comprising carbon dioxide, at least one fluoromonomer, and an initiator; and reacting said at least one fluoromonomer in said reaction mixture to form a fluoropolymer;
wherein said fluoromonomer is provided at a molarity of between about 2.7 and about 6.0, the molarity being sufficient that said fluoropolymer has a multimodal molecular weight distribution.

* * * * *

UNITED STATES PATENT AND TRADEMARK OFFICE
CERTIFICATE OF CORRECTION

PATENT NO. : 6,716,945 B2
DATED : April 6, 2004
INVENTOR(S) : DeSimone et al.

It is certified that error appears in the above-identified patent and that said Letters Patent is hereby corrected as shown below:

Column 8,
Line 36, should read -- invention, and do not limit the scope of the invention as defined --

Column 11,
Line 49, should read -- fluoromonomer is vinylidene fluoride. --

Signed and Sealed this

Tenth Day of August, 2004

JON W. DUDAS
*Acting Director of the United States Patent and Trademark Office*